US012682486B2

(12) United States Patent
Shiroshima

(10) Patent No.: US 12,682,486 B2
(45) Date of Patent: Jul. 14, 2026

(54) INFORMATION PROCESSING APPARATUS, POSITION ESTIMATION METHOD, AND NON-TRANSITORY COMPUTER-READABLE MEDIUM

(71) Applicant: NEC Corporation, Tokyo (JP)

(72) Inventor: Takahiro Shiroshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 18/276,329

(22) PCT Filed: Feb. 24, 2021

(86) PCT No.: PCT/JP2021/006881
§ 371 (c)(1),
(2) Date: Aug. 8, 2023

(87) PCT Pub. No.: WO2022/180692
PCT Pub. Date: Sep. 1, 2022

(65) Prior Publication Data
US 2024/0127474 A1      Apr. 18, 2024

(51) Int. Cl.
*G06T 7/73* (2017.01)
*G06T 7/246* (2017.01)

(52) U.S. Cl.
CPC ................ *G06T 7/74* (2017.01); *G06T 7/248* (2017.01); *G06T 2207/30244* (2013.01)

(58) Field of Classification Search
CPC .. G06T 7/74; G06T 7/248; G06T 2207/30244
See application file for complete search history.

(56) References Cited

U.S. PATENT DOCUMENTS

| 11,475,599 B2 * | 10/2022 | Shaw | A63B 60/46 |
| 2018/0211399 A1 * | 7/2018 | Lee | G06T 7/529 |

(Continued)

FOREIGN PATENT DOCUMENTS

| JP | 2008304268 A | * | 12/2008 | ......... | G06V 10/769 |
| WO | 2014/102995 A1 | | 7/2014 | | |

(Continued)

OTHER PUBLICATIONS

International Search Report for PCT Application No. PCT/JP2021/006881, mailed on May 18, 2021.

(Continued)

*Primary Examiner* — Pinalben Patel
(74) *Attorney, Agent, or Firm* — Sughrue Mion, P.LLC

(57) ABSTRACT

An information processing apparatus according to the present disclosure includes: a projection unit configured to arrange a predetermined number of virtual points in a front direction of an imaging device that captures a first image, by using an estimated position of the imaging device as a starting point, and project the virtual points onto each of a plurality of images used for generating an environment map being three-dimensional information; an image extraction unit configured to extract a second image from the plurality of images, based on a result of the projection of the virtual points; and an estimation unit configured to estimate, by using a feature point included in a target image being a target for estimating a position and a pose of an imaging device and a feature point included in the second image, aa position and a pose of the imaging device that captures the target image.

12 Claims, 8 Drawing Sheets

(56)         References Cited

U.S. PATENT DOCUMENTS

| | | | | |
|---|---|---|---|---|
| 2020/0175717 | A1* | 6/2020 | Tomioka | G06V 20/10 |
| 2021/0082143 | A1* | 3/2021 | Lee | G05D 1/02 |
| 2021/0256260 | A1* | 8/2021 | Kaneko | G01C 21/28 |

FOREIGN PATENT DOCUMENTS

| | | | |
|---|---|---|---|
| WO | 2018/235923 | A1 | 12/2018 |
| WO | 2019/130945 | A1 | 7/2019 |

OTHER PUBLICATIONS

Shuhei Hamada et al., "Pose estimation of a mobile camera by using environmental cameras for MR," IPSJ SIG Technical Reports, vol. 2008, No. 115, Nov. 20, 2008, pp. 109-116.

* cited by examiner

| ID | SfM | x | y | z | qw | qx | qy | qz | LANDMARK |
|----|------|-------|------|------|-------|------|------|------|----------|
| 1 | True | -2.1 | -3.3 | 0.7 | -0.06 | 0.14 | 0.39 | 0.9 | 1, 2, 3 |
| 2 | False | 0.17 | -0.2 | 0.7 | -0.09 | 0.14 | 0.52 | 0.83 | 3, 4, 5 |
| 3 | True | 0.45 | 0.12 | 0.69 | -0.1 | 0.13 | 0.6 | 0.7 | 1, 4, 5, 7 |
| . . | | | | | | | | | |

Fig. 3

| ID | x | y | z | FEATURE VECTOR FOR EACH KEYFRAME |
|----|------|------|------|----------------------------------|
| 1 | 3.5 | 2 | 1.2 | 1{...},3{...} |
| 2 | -1.3 | -1.5 | -0.5 | 1{...} |
| ⋮ |  |  |  |  |

INFORMATION PROCESSING APPARATUS, POSITION ESTIMATION METHOD, AND NON-TRANSITORY COMPUTER-READABLE MEDIUM

This application is a National Stage Entry of PCT/JP2021/006881 filed on Feb. 24, 2021, the contents of all of which are incorporated herein by reference, in their entirety.

TECHNICAL FIELD

The present disclosure relates to an information processing apparatus, a position estimation method, a program, and a non-transitory computer-readable medium storing the program.

BACKGROUND ART

In recent years, a service using a robot being designed to move autonomously has become popular. In order for a robot to move autonomously, it is necessary for the robot to recognize surrounding environment and perform self-localization with high accuracy. Therefore, use of visual simultaneous localization and mapping (VSLAM), in which processing of generating a surrounding environment map by using a video captured by the robot and processing of performing self-localization by referring to the generated environment map are performed simultaneously, is being considered. In a general VSLAM, an identical point captured in a plurality of videos is recognized as a feature point in a plurality of images (still images) constituting the videos, and a position of a camera that has captured the video is estimated from a difference of the feature point between the images. Further, in VSLAM, the position of the camera is recognized as a position of the robot. Specifically, the position of the camera that has captured the video is estimated by using a two-dimensional position acquired by estimating a three-dimensional position of the feature point included in the plurality of images and projecting the estimated three-dimensional position onto an image, and a difference in a position of the feature point included in the image. In such VSLAM, immediate processing is required to be performed.

In general, when VSLAM is executed, the position of the camera is estimated by matching feature points included in an image for estimating the position of the camera and an image captured immediately before such an image. Herein, when there is an error in the three-dimensional position of the feature point estimated in real time, the position of the camera estimated by using the three-dimensional position with the error becomes inaccurate.

Patent Literature 1 discloses processing of extracting a geotag image stored in a server by using latitude and longitude information, and performing self-localization of a camera or the like by using a difference of a feature point between images in a plurality of geotag images.

CITATION LIST

Patent Literature

[Patent Literature 1] International Patent Publication No. WO2018/235923

SUMMARY OF INVENTION

Technical Problem

However, in the self-localization processing disclosed in Patent Literature 1, when the latitude and longitude information is unknown, the geotag image cannot be extracted, and the self-localization processing cannot be performed. Therefore, in Patent Literature 1, there is a problem that, when the latitude and longitude information is unknown, accuracy of the self-position cannot be improved.

An object of the present disclosure is to provide an information processing apparatus, a position estimation method, a program, and a non-transitory computer-readable medium storing the program that enable highly accurate self-localization.

Solution to Problem

An information processing apparatus according to a first aspect of the present disclosure includes: a projection unit configured to arrange a predetermined number of virtual points in at least one of a front direction and a back direction of an imaging device that captures a first image by using an estimated position of the imaging device as a starting point, and project the virtual points onto each of a plurality of images used for generating an environment map being three-dimensional information; an image extraction unit configured to extract a second image from the plurality of images, based on a result of the projection of the virtual points; and an estimation unit configured to estimate, by using a feature point included in a target image being a target for estimating a position and a pose of the imaging device, and a feature point included in the second image, a position and a pose of the imaging device that captures the target image.

A position estimation method according to a second aspect of the present disclosure includes: arranging a predetermined number of virtual points in at least one of a front direction and a back direction of an imaging device that captures a first image, by using an estimated position of the imaging device as a starting point; projecting the virtual points onto each of a plurality of images used for generating an environment map being three-dimensional information; extracting a second image from the plurality of images, based on a result of the projection of the virtual points; and estimating, by using a feature point included in a target image being a target for estimating a position and a pose of the imaging device, and a feature point included in the second image, a position and a pose of the imaging device that captures the target image.

A program according to a third aspect of the present disclosure or a recording medium storing the program causes a computer to execute: arranging a predetermined number of virtual points in at least one of a front direction and a back direction of an imaging device that captures a first image, by using an estimated position of the imaging device as a starting point; projecting the virtual points onto each of a plurality of images used for generating an environment map being three-dimensional information; extracting a second image from the plurality of images, based on a result of the projection of the virtual points; and estimating, by using a feature point included in a target image being a target for estimating a position and a pose of the imaging device, and a feature point included in the second image, a position and a pose of the imaging device that captures the target image.

Advantageous Effects of Invention

According to the present disclosure, an information processing apparatus, a position estimation method, a program, and a non-transitory computer-readable medium storing the program that enable highly accurate self-localization can be provided.

BRIEF DESCRIPTION OF DRAWINGS

FIG. 3 is a diagram illustrating a keyframe list according to the second example embodiment;

FIG. 4 is a diagram illustrating a landmark list according to the second example embodiment;

EXAMPLE EMBODIMENT

First Example Embodiment

Figure 1:
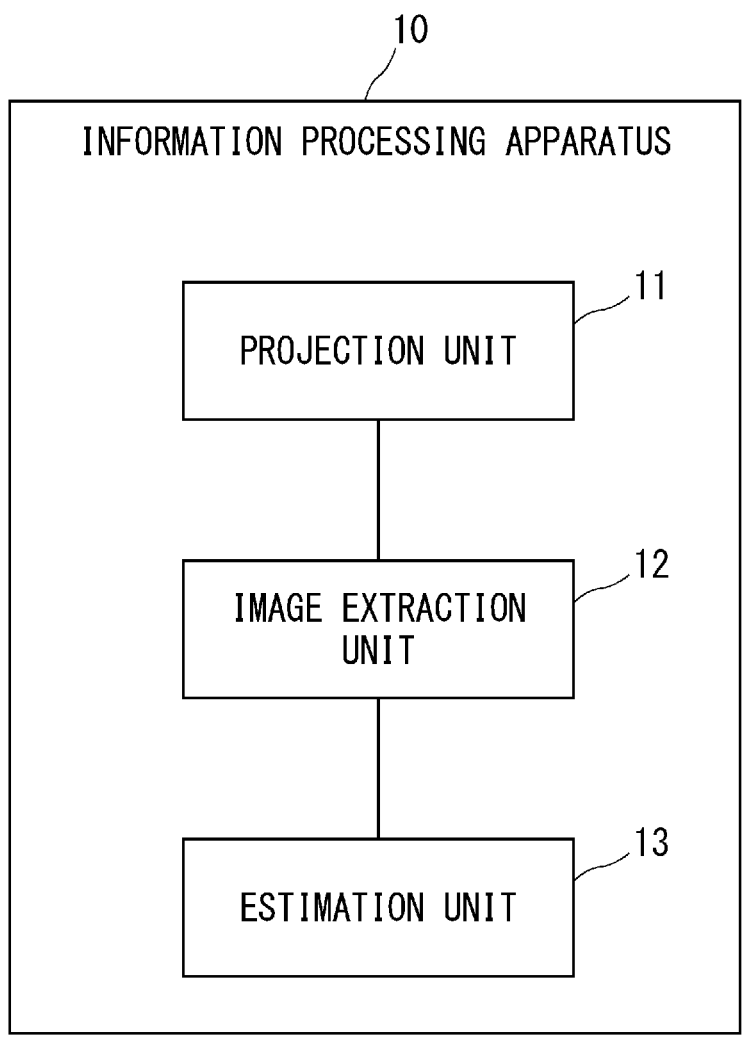
FIG. 1 is a configuration diagram of an information processing apparatus according to a first example embodiment.

Hereinafter, example embodiments of the present invention will be described with reference to the drawings. A configuration example of the information processing apparatus 10 will be described with reference to FIG. 1. The information processing apparatus 10 may be a computer apparatus operated by having a processor execute a program stored in a memory.

The information processing apparatus 10 includes a projection unit 11, an image extraction unit 12, and an estimation unit 13. The projection unit 11, the image extraction unit 12, and the estimation unit 13 may be software or modules in which processing is executed by a processor executing a program stored in a memory. Alternatively, the projection unit 11, the image extraction unit 12, and the estimation unit 13 may be hardware, such as a circuit or a chip.

The projection unit 11 arranges a predetermined number of virtual points in at least one of the front direction and the back direction of an imaging device that captured a first image, by using an estimated position of the imaging device as a starting point, and projects the virtual points onto each of a plurality of images used for generating an environment map being three-dimensional information.

The imaging device may be, for example, a camera or an apparatus having a camera function. The apparatus having a camera function may be, for example, a mobile terminal such as a smartphone. The image may be, for example, a still image. Alternatively, the image may be a frame image constituting a moving image. The plurality of images may be data sets or data records representing a plurality of still images, such as a plurality of frame images constituting a moving image. Alternatively, the plurality of images may be frame images extracted from the plurality of frame images constituting the moving image.

The estimated position of the imaging device that captured the first image may be given in advance as an initial value, for example, or may be given a position of an image which was most recently estimated among the images captured continuously by the imaging device, or a position inferred from the history of the positions of the images captured continuously. Further, a position being inferred from an image in which, based on pattern matching of an image, a position similar to the position of the image is known may be given as the estimated position.

The front direction of the imaging device may be, for example, an imaging direction of the imaging device. The imaging direction of the imaging device may be, for example, a direction in which the lens of the imaging device faces. Further, the front direction of the imaging device may be a direction toward a space included in an angle of view of the imaging device with the estimated position of the imaging device as a starting point. Further, the back direction may be a direction opposite the front direction. In other words, the front direction and the back direction of the imaging device may be referred to as a direction of a virtual straight line passing through the center of the angle of view of the imaging device and extending along the front direction (forward direction) and the back direction (rear direction) of the imaging device. The virtual point is a point that is virtually arranged in a three-dimensional space. The position of the virtual point may be indicated using three-dimensional coordinates. The three-dimensional coordinates may be indicated using, for example, a world coordinate system.

The environment map being three-dimensional information is a map illustrating an environment around the imaging device by using three-dimensional information. The three-dimensional information may be referred to as 3D information, three-dimensional coordinates, or the like. The environment map includes map information indicating an environment around the imaging device, and also includes information on the position and pose of the imaging device. The pose of the imaging device may be, for example, information relating to the inclination of the imaging device. The environment map is generated by specifying imaging positions at which a plurality of images are captured and restoring a three-dimensional position of a feature point recorded on the image. That is, the environment map includes information on a three-dimensional position or three-dimensional coordinates of a feature point in an image captured by the imaging device. For example, the environment map may be generated by executing Structure from Motion (SfM) by using a plurality of images. The SfM is a technique of calculating all feature points in a series of already acquired two-dimensional images (or frames) and estimating the matching feature points from a plurality of images captured at different timings. Further, the SfM is a technique of accurately estimating the three-dimensional position or pose of a camera which captured each frame, based on the difference in the position on the two-dimensional plane in the frame in which each feature point appears.

Projecting a virtual point onto an image may be converting the three-dimensional coordinates of the virtual point into two-dimensional coordinates included in an imaging device that captured the image. The two-dimensional coordinates included in the imaging device may be referred to as camera coordinates, for example.

The image extraction unit 12 extracts a second image from the plurality of images used for generating the environment map, based on a result of the projection of virtual points. The result of projection of the virtual points may be, for example, information regarding the number of virtual points being projected in the image. The second image is the image used for generating the environment map. The image extraction unit 12 may extract, as the second image, an image in which the result of the projection of the virtual points satisfies a predetermined criterion from among the plurality of images.

The estimation unit 13 estimates, by using feature points included in a target image being a target for estimating the position and pose of the imaging device and feature points included in the second image, the position and pose of the imaging device that captured the target image. The feature points included in the second image and the target image may be detected using, for example, SIFT, SURF, ORB, AKAZE, or the like. The feature points included in the second image and the target image may be indicated using two-dimensional coordinates being camera coordinates.

As described above, the information processing apparatus 10 is able to estimate the position and pose of the imaging device that captured the target image by using the image used for generating the environment map. The environment map is generated by executing SfM or the like and using the three-dimensional position of the feature point of each image restored with high accuracy. Therefore, in a case where the position and pose of the imaging device that captured the target image are estimated using the image used for generating the environment map, the estimation accuracy of the position and pose of the imaging device can be improved as compared with a case where the image in which an error occurs in the three-dimensional position of the feature point is used.

Further, the image extraction unit 12 of the information processing apparatus 10 extracts the second image from the plurality of images, based on the result of the projection of the virtual points. For example, a second image having a large number of virtual points being projected in the image is likely to capture an area overlapping with an area included in the target image. By using the second image including the overlapping areas in such a manner, the number of corresponding feature points between images can be increased. As a result, it is possible to improve the estimation accuracy of the position and pose of the imaging device that captured the target image.

Second Example Embodiment

Figure 2:
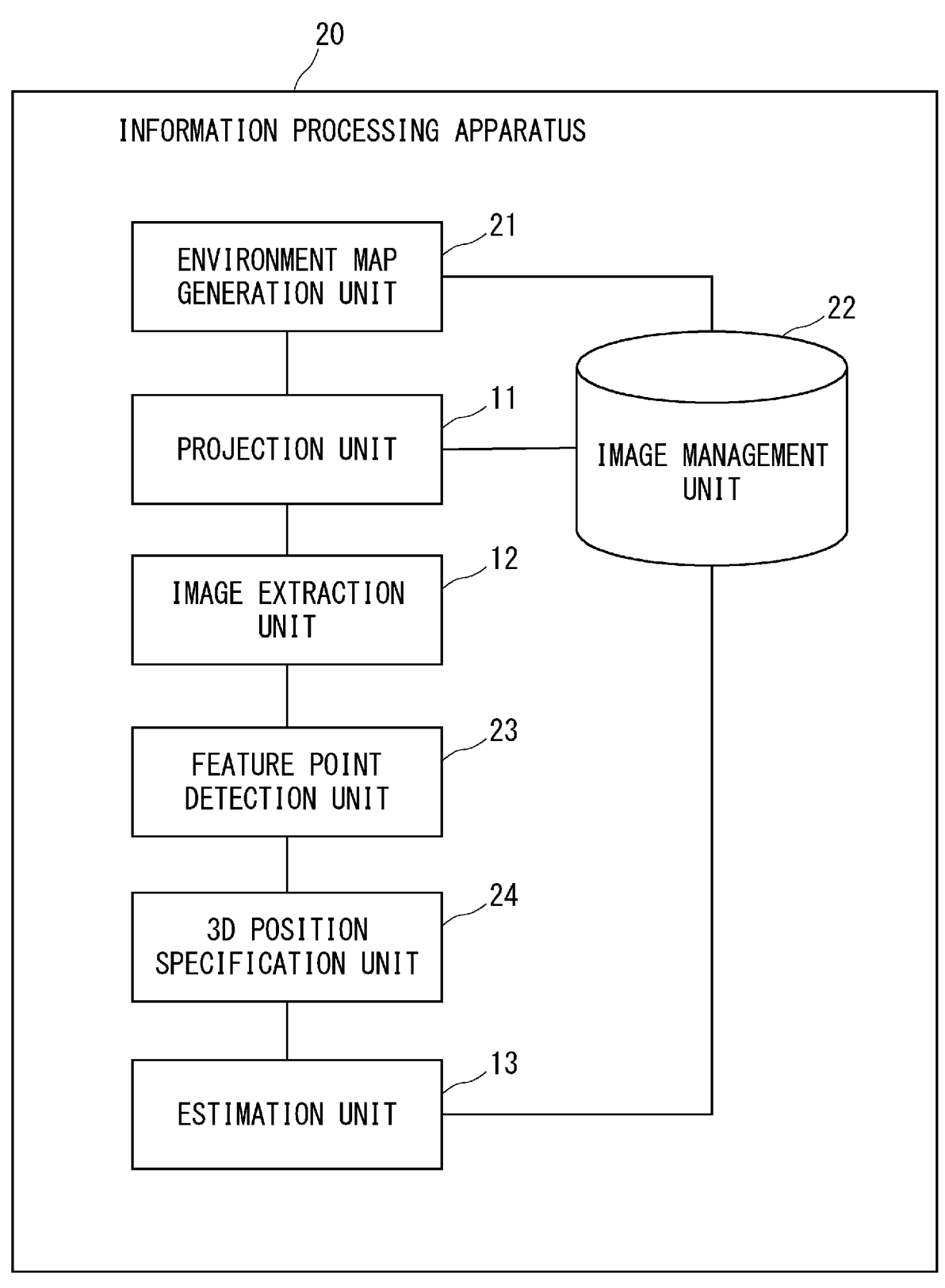
FIG. 2 is a configuration diagram of an information processing apparatus according to a second example embodiment.

Next, a configuration example of an information processing apparatus 20 according to the second example embodiment will be described with reference to FIG. 2. The information processing apparatus 20 has a configuration in which an environment map generation unit 21, an image management unit 22, a feature point detection unit 23, and a 3D position identification unit 24 are added to the information processing apparatus 10 of FIG. 1. The constituent elements of the information processing apparatus 20 such as the environment map generation unit 21 may be software or modules in which processing is executed by the processor executing a program stored in a memory. Alternatively, the constituent elements of the information processing apparatus 20 may be hardware such as a circuit or a chip.

The information processing apparatus 20 uses a plurality of images captured by an imaging device to estimate in real time the position and pose of the imaging device that captured each of the images. For example, the information processing apparatus 20 executes VSLAM to estimate in real time the position and pose of the imaging device that captured each image. For example, the information processing apparatus 20 is used when correcting the position and pose of a robot that moves autonomously. For example, an image captured in real time by a moving robot is compared with an environment image similar to an image captured in real time among images used for generating a three-dimensional map by using SfM. The comparison between the image captured in real time and the images used for generating the three-dimensional map is performed using the feature points included in each of the images. The position and pose of the robot are estimated and corrected based on a result of the comparison. Herein, the estimation and correction of the position and pose of the robot are performed by VSLAM. In addition, in the present disclosure, the robot is not limited to a form of a device as long as it can move, but broadly includes, for example, a robot shaped in a form of a person or an animal, a conveyance vehicle (for example, Automated Guided Vehicle) which moves using wheels, and the like.

The environment map generation unit 21 generates an environment map by executing SfM by using a plurality of images captured by the imaging device. When the information processing apparatus 20 has a camera function, the environment map generation unit 21 may generate an environment map by using an image captured by the information processing apparatus 20. Alternatively, the environment map generation unit 21 may generate an environment map by receiving an image captured by an imaging device that is a different apparatus from the information processing apparatus 20 via a network or the like.

The environment map generation unit 21 generates an environment map before executing processing of estimating, in real time, the position and pose of the imaging device that captured the image. In a case of generating an environment map by using SfM, the number of images being used for generating the environment map is larger and the computational complexity is larger, compared to a case where a three-dimensional map is generated by using VSLAM. Therefore, the environment map generated by using SfM has higher reproduction accuracy of the environment around the imaging device, compared to the three-dimensional map generated by using VSLAM together with the position and pose of the imaging device.

The environment map generation unit 21 outputs the environment map and the plurality of images used for generating the environment map to the image management unit 22. At this time, the environment map generation unit 21 may not pass the image information as it is, but may output only the information on the feature point detected in the image as an image. The image management unit 22 manages the environment map and the image received from the environment map generation unit 21. Further, the image management unit 22 manages each of the images received from the environment map generation unit 21 in association with the position and pose of the imaging device at which each of the images were captured. Further, the image management unit 22 manages each of the images in association with the three-dimensional coordinates of the feature points in each of the images on the environment map. The image managed by the image management unit 22 may be referred to as a keyframe. Herein, the keyframe may be referred to as a frame image that may serve as a base point for a series of image processing described below. Further, the three-dimensional coordinates of the feature points in the keyframe on the environment map may be referred to as landmarks.

FIG. 3 illustrates a keyframe list managed by the image management unit 22. An ID is information being used for identifying a keyframe. Different IDs are assigned for each keyframe. SfM in the keyframe list indicates whether the keyframe is used in executing SfM. For example, in generating the environment map, the keyframe list may manage not only an image used in the execution of SfM but also an image satisfying a predetermined criterion as a keyframe. A keyframe in which SfM is set to True is an image being used in execution of SfM, and a keyframe in which SfM is set to False is an image not used in execution of SfM. For example, when the estimation accuracy of the three-dimensional coordinates corresponding to the feature points included in the image is higher than a predetermined criterion, the image may be added as a keyframe. Alternatively, an image including more than a predetermined threshold of feature points that match feature points included in the image used in the execution of SfM may be added as a keyframe.

Each of x, y, and z indicates a three-dimensional position or three-dimensional coordinates of the imaging device that captured the keyframe. The four parameters of qw, qx, qy, and qz indicate the rotation information and pose of the imaging device. The landmark indicates an ID of a landmark associated with a feature point included in the keyframe. For example, a keyframe having an ID of 1 includes feature points corresponding to landmarks having IDs of 1, 2, and 3.

FIG. 4 illustrates a landmark list. The ID is information being used for identifying the landmark. x, y, and z indicate the three-dimensional position of the landmark on the environment map. In addition, the landmark may be included in a plurality of keyframes. Therefore, the feature vector for each keyframe is information indicating feature points corresponding to the landmarks in each of the keyframes in a vector format. For example, a landmark having an ID of 1 corresponds to a feature point included in a keyframe having a keyframe ID of 1 and 3.

Returning to FIG. 2, a projection unit 11 arranges a predetermined number of virtual points on a straight line (that is, a virtual straight line extending in the imaging direction: the same applies hereinafter) from the imaging device toward the imaging direction, with the estimated position of the imaging device that captured the virtual point-related image as a starting point. The virtual point-related image is an image in which the position, the pose, and the three-dimensional position of the feature point in the image of the imaging device have already been estimated by using VSLAM. The virtual point-related image may be, for example, an image captured before the target image for estimating the position and pose of the imaging device in real time, and may be an image in which the position and pose of the imaging device are estimated immediately before the target image for estimating the position and pose. When the information processing apparatus 20 has a camera function, an image captured by the information processing apparatus 20 may be used as a virtual point-related image. Alternatively, the projection unit 11 may receive an image captured by an imaging device that is a different apparatus from the information processing apparatus 20 via a network or the like, and use the received image as a virtual point-related image.

Herein, as the virtual point-related image, an image being a target for estimating in real time the position and pose of the imaging device may be used. In such a case, the position of the imaging device being the starting point of the straight line for arranging the virtual points may be predicted by using the speed and the angular velocity between the frames among the image being the target of estimating, in real time, the position and pose of the imaging device and the image which is one frame before the target image. Further, the pose of the imaging device being the starting point of the straight line on which the virtual point is arranged may also be predicted by using the speed and the angular velocity between the frames.

Figure 5:
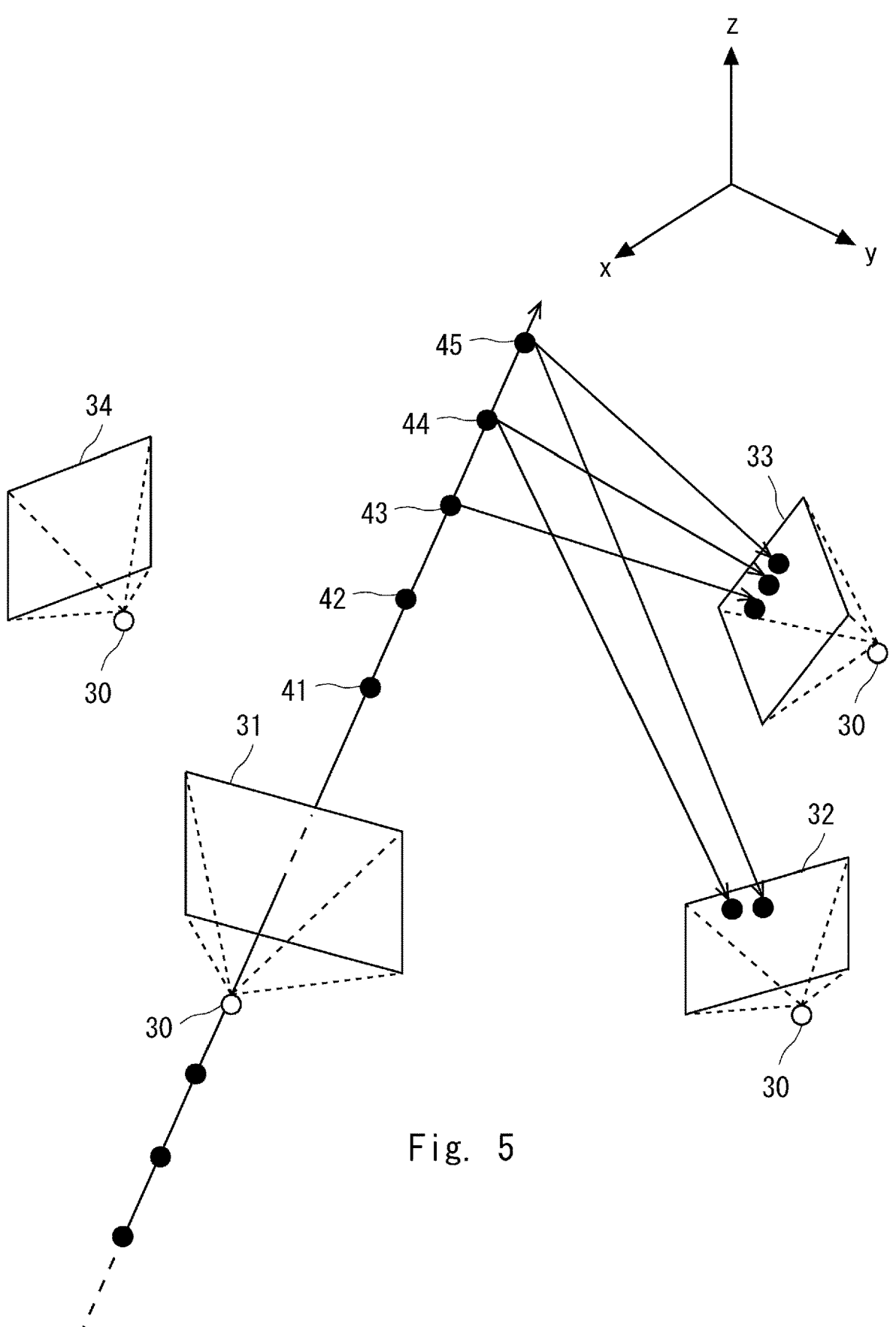
FIG. 5 is a diagram for describing projection processing of a virtual point according to the second example embodiment.

Herein, processing of projecting the virtual point by the projection unit 11 will be described with reference to FIG. 5. FIG. 5 illustrates a three-dimensional space represented using the X-axis, the Y-axis and the Z-axis. FIG. 5 illustrates images 31 to 34 captured at different locations by the imaging device 30. The images 31 to 34 illustrate scenes included in the angle of view at the time of capturing an image by the imaging device 30 as two-dimensional images. In order to illustrate the relationship between the position of the imaging device 30, the imaging direction of the imaging device 30, and the captured images 31 to 34, FIG. 5 illustrates a state in which the images 31 to 34 are virtually arranged in the three-dimensional space in consideration of the focal length, the angle of view, and the like of the imaging device 30.

It is assumed that the position and pose of the imaging device 30 that captured the image 31 have already been estimated by VSLAM. Virtual points 41 to 45 are arranged on a straight line extending in the imaging direction, starting from the position of the imaging device 30 that captured the image 31. The number of virtual points is not limited to five. Further, the distance between adjacent virtual points may be at equal intervals or at any intervals. The image 31 is a virtual point-related image, and the images 32 to 34 are keyframes. Further, the plurality of virtual points may be arranged on a bisector of an angle of view of the imaging device 30 which is determined based on the position and pose of the imaging device 30 that captured the image 31.

FIG. 5 illustrates a state where the virtual points 41 to 45 are being projected onto the image 32 and the image 33 which are keyframes. With respect to the image 34, since the virtual points 41 to 45 are not within the imaging direction of the imaging device 30, the virtual points 41 to 45 are not projected onto the image 34.

The projection unit 11 may perform processing of projecting the virtual points 41 to 45 onto all of the keyframes being managed by the image management unit 22. Alternatively, the projection unit 11 may perform processing of projecting the virtual points 41 to 45 only onto a keyframe in which SfM is set to True among the keyframes being managed by the image management unit 22. Alternatively, the projection unit 11 may not perform projection processing on a keyframe captured at a location where the position and the distance of the imaging device that captured a virtual point-related image or an image being a target of estimating the position and pose of the imaging device in real time are separated by a threshold value or more. Herein, projection processing of the projection unit 11 projecting the virtual points 41 to 45 onto the image 32 will be described.

The projection unit 11 multiplies the three-dimensional coordinates of the virtual point 41 by a rotation matrix indicating the position and pose of the imaging device 30 when the image 32 is captured and a matrix of camera parameters indicating the focus and the center point of the imaging device 30. The camera parameters include information relating to an angle of view, and the angle of view generally includes the number of horizontal pixels, the number of vertical pixels, the focal length between an optical sensor and a lens, and the like. Thus, the projection unit 11 calculates the projection position of the virtual point 41 on a plane including the image 32. The projection position is specified by using, for example, camera coordinates of the imaging device 30. Similarly to the virtual point 41, the projection unit 11 similarly calculates the projection positions of each of the virtual points on a plane including the image 32 for the virtual points 42 to 45. Further, the projection unit 11 similarly performs processing of projecting the virtual points 41 to 45 onto the image 33, the image 34, and the like. In FIG. 5, the virtual points 44 and 45 are illustrated to be contained in the image 32. Further, it is illustrated that the virtual points 43 to are contained in the image 33. Further, it is illustrated that none of the virtual points 41 to 45 is contained in the image 34.

Returning to FIG. 2, the image extraction unit 12 extracts an overlapping keyframe among a plurality of keyframes, based on the result of the projection processing in the projection unit 11. For example, the image extraction unit 12 may calculate a score for each image by applying the number of virtual points contained in each image to the following equation 1.

$$Sn=N/\{(aDn+\alpha)(bRn+\beta)\} \qquad \text{Equation 1:}$$

Sn: Score of image n

N: Number of virtual points contained in image n

Dn: Distance between the imaging device which captured the virtual point-related image and the imaging device which captured the image n Rn: angle between the imaging device that captured the virtual point-related image and the imaging device that captured the image n a, b, $\alpha$, $\beta$: any coefficient

[/]: Division symbol

Equation 1 indicates that a score is calculated in consideration of a distance and an angle from an imaging device that captured a virtual point-related image, rather than merely extracting an image having a large number of virtual points contained in the image as an overlapping keyframe. Whether the distance is prioritized or the angle is prioritized is achieved by changing the values of a, b, $\alpha$, and $\beta$, and an appropriate value for improving the matching accuracy of the feature points is given. The improvement in the matching accuracy may be, for example, an increase in the number of feature points to be matched and a non-matching of the wrong feature points.

The feature point detection unit 23 performs feature point matching by using a real-time image acquired after a predetermined period has elapsed since the virtual point-related image was acquired from the imaging device or the camera function in the information processing apparatus 20 and another image. The real-time image may be, for example, an image acquired by the feature point detection unit 23 subsequently to the virtual point-related image. That is, when the feature point detection unit 23 continuously acquires the virtual point-related image and the real-time image, the virtual point-related image may be an image acquired immediately before the real-time image. In other words, the virtual point-related image may be an image captured by the imaging device or the camera function in the information processing apparatus 20 immediately before the real-time image.

Herein, position estimation processing of the imaging device 30 executed in the information processing apparatus 20 will be described with reference to FIG. 6.

The feature point detection unit 23 performs feature point matching between the real-time image and a plurality of images. For example, the plurality of images for which the feature point detection unit 23 performs feature point matching may be an image acquired one frame before the real-time image, an image acquired two frames before the real-time image, any keyframe managed by the image management unit 22, or an overlapping keyframe. An image acquired one frame before the real-time image is referred to as a one-frame-before image, and an image acquired two frames before the real-time image is referred to as a two-frames-before image.

Figure 6:
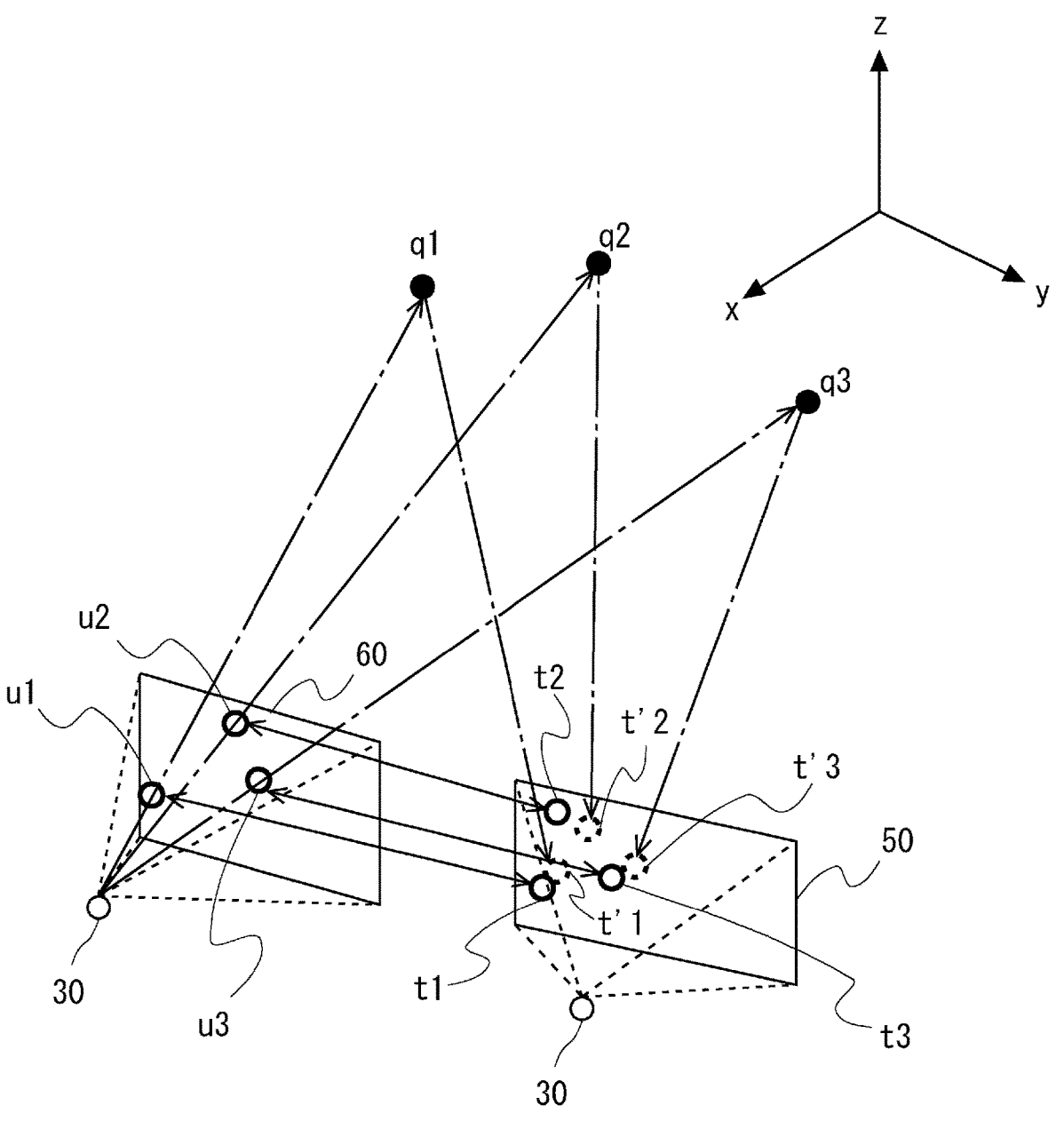
FIG. 6 is a diagram for describing position estimation processing for the imaging device according to the second example embodiment.

For example, FIG. 6 illustrates a state where feature point matching between a real-time image 50 and an overlapping keyframe 60 is being performed. Feature point matching processing using a one-frame-before image, a two-frames-before image, and any keyframe managed by the image management unit 22 is similar to the feature point matching using the overlapping keyframe. Therefore, a detailed description of the feature point matching processing using a one-frame-before image, a two-frames-before image, and any keyframe managed by the image management unit 22 will be omitted.

The feature point detection unit 23 detects feature points in each image being used for feature point matching. The feature point detection unit 23 may detect feature points in each image by using, for example, SIFT, SURF, ORB, AKAZE, or the like. Specifically, the feature point detection unit 23 detects u1, u2, and u3 in the overlapping keyframe 60 as feature points (hereinafter, referred to as known feature points), and detects t1, t2, and t3 in the real-time image 50 as feature points (hereinafter, referred to as new feature points). Further, the feature point detection unit 23 compares the feature vectors of the known feature points and the feature vectors of the new feature points, and matches the feature points the distances of which indicated by vectors are close to each other. In FIG. 6, the feature point detection unit 23 makes u1 correspond to t1, u2 correspond to t2, and u3 correspond to t3. "u1 corresponds to t1" may be referred to as matching, and means that u1 and t1 indicate the same three-dimensional point.

The feature point detection unit 23 also performs feature point matching between each of the one-frame-before image, the two-frames-before image, and any keyframe managed by the image management unit 22, and the real-time image.

Herein, when a plurality of known feature points in a plurality of images correspond to one new feature point in the real-time image, the feature point detection unit 23 determines one known feature point corresponding to the new feature point from among the plurality of known feature points according to a predetermined criterion.

For example, as the predetermined criterion, a known feature point in a keyframe set as SfM:True in the keyframe list may be preferentially determined as the known feature point corresponding to the new feature point. Alternatively, as the predetermined criterion, a known feature point closest to the center coordinates of the plurality of known feature points may be preferentially determined as the known feature point corresponding to the new feature point. Alternatively, as the predetermined criterion, a known feature point included in an image acquired one frame before the real-time image may be preferentially determined as the known feature point corresponding to the new feature point.

The 3D position specification unit 24 searches for a three-dimensional point (landmark) of the known feature point determined by the feature point detection unit 23. For example, it is assumed that the feature point detection unit 23 determines a feature point in the overlapping keyframe 60 as the known feature point corresponding to the new feature point. In such a case, as illustrated in FIG. 6, the 3D position specification unit 24 searches for q1, q2, and q3 being landmarks corresponding to the feature points u1, u2, and u3, respectively. q1 indicates a three-dimensional point (or three-dimensional coordinates) of the feature point u1. Similarly, q2 indicates a three-dimensional point of u2, and q3 indicates a three-dimensional point of u3. q1, q2, and q3 are three-dimensional points on an environment map generated by using SfM. Therefore, q1, q2, and q3 are three-dimensional points estimated with higher accuracy than three-dimensional points estimated by using VSLAM.

The estimation unit 13 estimates the position and pose of the imaging device 30 that captured the real-time image 50 by using the new feature point, the known feature point, and the three-dimensional point of the known feature point. Specifically, the estimation unit 13 assumes the position and pose of the imaging device 30 that captured the real-time image 50. The feature point detection unit 23 projects the positions of q1, q2, and q3 in a case where q1, q2, and q3 are captured from the assumed position and pose of the imaging device 30 onto the real-time image 50. The estimation unit 13 repeats projecting the positions of q1, q2, and q3 onto the real-time image 50 while changing the position and pose of the imaging device 30 that captured the real-time image 50. t'1, t'2, and t'3 indicated by the dotted lines in the real-time image 50 indicate q1, q2, and q3 being projected onto the real-time image 50.

The estimation unit 13 estimates a position and pose of the imaging device at which the difference between the projected t'1, t'2, and t'3 and the feature points t1, t2, and t3 in the real-time image 50 becomes the smallest, as the position and pose of the imaging device 30.

Figure 7:
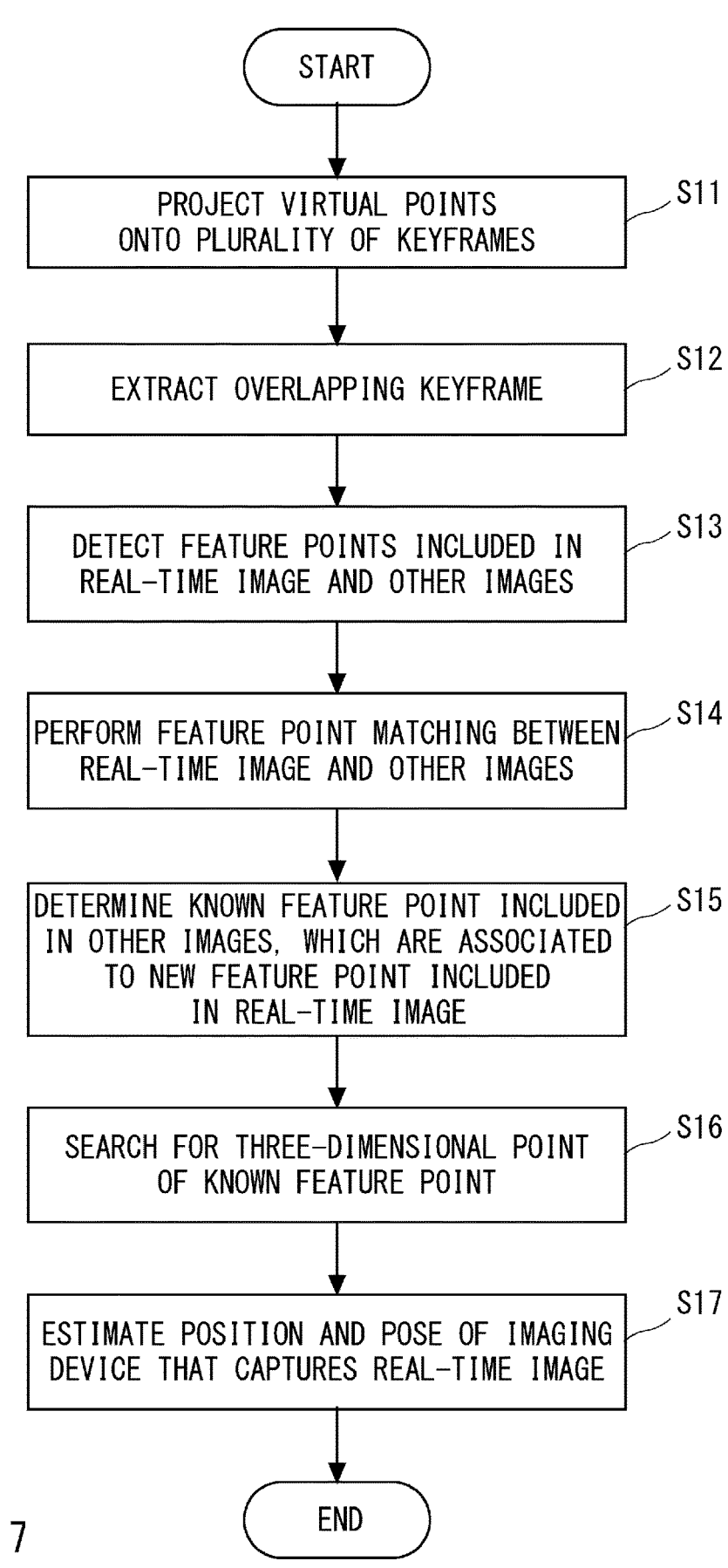
FIG. 7 is a diagram illustrating a flow of the position estimation processing for the imaging device according to the second example embodiment.

Next, a flow of processing for estimating the position and pose of the imaging device according to the second example embodiment will be described with reference to FIG. 7. Herein, it is assumed that the environment map generation unit 21 has already generated the environment map by executing SfM by using a plurality of images before the processing described in FIG. 7 is executed. That is, before the processing described in FIG. 7 is executed, the image management unit 22 manages the keyframe, the keyframe list, and the landmark list being used in generating the environment map.

First, the projection unit 11 projects a virtual point onto a plurality of keyframes (S11). The projection unit 11 specifies an imaging direction, based on the position and pose of an imaging device that captured a virtual point-related image. Further, the projection unit 11 projects a virtual point arranged on a straight line extending in the imaging direction, while using the position of the imaging device as a starting point, onto a keyframe managed by the image management unit 22.

Next, the image extraction unit 12 extracts at least one overlapping keyframe from the plurality of keyframes in which the virtual point is projected (S12). The image extraction unit 12 calculates a score for each keyframe on which a virtual point is projected by using equation 1 described above. The image extraction unit 12 may extract the keyframe having the highest score as the overlapping keyframe. Alternatively, the image extraction unit 12 may extract a predetermined number of keyframes in descending order of the score as overlapping keyframes. Alternatively, the image extraction unit 12 may extract all keyframes satisfying a predetermined score as overlapping keyframes.

Next, the feature point detection unit 23 detects feature points of a one-frame-before image, a two-frames-before image, any keyframe managed by the image management unit 22, and an overlapping keyframe together with feature points of the real-time image (S13). Herein, it is assumed that the feature points of the one-frame-before image and the two-frames-before image are detected, but the feature point detection unit 23 may detect feature points up to an n (n is a positive integer)-frames-before image.

Next, the feature point detection unit 23 performs feature point matching between the real-time image and each of the one-frame-before image, the two-frames-before image, any keyframe managed by the image management unit 22, and the overlapping keyframe (S14). The feature point detection unit 23 may sequentially perform feature point matching between the real-time image and each of the images (serial processing). Alternatively, the feature point detection unit 23 may perform feature point matching between the real-time image and each of the images in parallel and execute the matchings at the same timing.

Next, the feature point detection unit 23 determines one known feature point corresponding to a new feature point from among a plurality of known feature points corresponding to one new feature point in the real-time image according to a predetermined criterion (S15).

Next, the 3D position specification unit 24 searches for a three-dimensional point of the known feature point determined in step S13 (S16). For example, the 3D position specification unit 24 searches for a three-dimensional point on the environment map which corresponds to the known feature point.

Next, the estimation unit 13 estimates the position and pose of the imaging device that captured the real-time image (S17).

As described above, the information processing apparatus 20 according to the second example embodiment extracts the overlapping keyframe according to a score acquired when the virtual point is projected onto the keyframe. A keyframe having a high score means that the overlap degree between an area included in the real-time image and an area included in the keyframe is high. As a result, the information processing apparatus 20 is able to specify, as an overlapping keyframe, a keyframe having a large area overlapping with an area included in the real-time image. The information processing apparatus 20 may improve the accuracy of feature point matching by using such an overlapping keyframe for the feature point matching. As a result, the information processing apparatus 20 is able to improve the estimation accuracy of the position and pose of the imaging device as compared with a case where the overlapping keyframe is not used.

Figure 8:
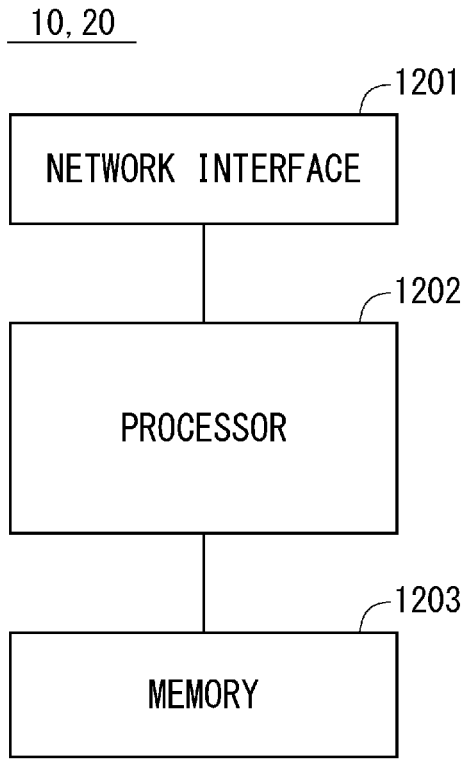
FIG. 8 is a configuration diagram of an information processing apparatus according to each example embodiment.

FIG. 8 is a block diagram illustrating a configuration example of the information processing apparatus 10 and the information processing apparatus 20 (hereinafter, referred to as the information processing apparatus 10 and the like). Referring to FIG. 8, the information processing apparatus 10 and the like include a network interface 1201, a processor 1202, and a memory 1203. The network interface 1201 may be used for communicating with another network node. The network interface 1201 may include, for example, a network interface card (NIC) compliant with IEEE 802.3 series.

The processor 1202 reads and executes software (computer program) from the memory 1203, and thereby performs processing of the information processing apparatus 10 and the like described with reference to the flowchart in the above-described example embodiment. The processor 1202 may be, for example, a microprocessor, an MPU, or a CPU. The processor 1202 may include a plurality of processors.

The memory 1203 is configured from a combination of a volatile memory and a non-volatile memory. The memory 1203 may include storage arranged separately from the processor 1202. In such a case, the processor 1202 may access the memory 1203 via an input/output (I/O) interface (not illustrated).

In the example of FIG. 8, the memory 1203 is used for storing software modules. The processor 1202 reads and executes such software modules from the memory 1203, and thereby enables processing of the information processing apparatus 10 and the like described in the above-described example embodiments to be performed.

As described with reference to FIG. 8, each of the processors included in the information processing apparatus 10 and the like in the above-described example embodiment executes one or a plurality of programs including an instruction group for causing a computer to execute the algorithm described with reference to the drawings.

In the examples described above, the program may be stored by using various types of non-transitory computer-readable media and provided to a computer. Non-transitory computer-readable media include various types of tangible storage media. Examples of the non-transitory computer-readable media include magnetic recording media (e.g., flexible disk, magnetic tape, and hard disk drive), magneto-optical recording media (e.g., magneto-optical disk), CD-read only memory (ROM), CD-R, CD-R/W, and semiconductor memory (e.g., mask ROM, programmable ROM (PROM), erasable PROM (EPROM), flash ROM, and random access memory (RAM)). The program may also be provided to a computer by using various types of transitory computer-readable media. Examples of transitory computer-readable media include electrical signals, optical signals, and electromagnetic waves. The transitory computer-readable medium may supply the program to the computer via a wired communication path such as an electric wire and an optical fiber, or a wireless communication path.

Note that, the present disclosure is not limited to the above-described example embodiments, and can be appropriately modified without departing from the scope of the present disclosure.

The whole or part of the example embodiments disclosed above can be described as, but not limited to, the following supplementary notes.

Supplementary Note 1

An information processing apparatus including:

a projection unit configured to arrange a predetermined number of virtual points in at least one of a front direction and a back direction of an imaging device that captures a first image by using an estimated position of the imaging device as a starting point, and project the virtual points onto each of a plurality of images used for generating an environment map being three-dimensional information;

an image extraction unit configured to extract a second image from the plurality of images, based on a result of the projection of the virtual points; and an estimation unit configured to estimate, by using a feature point included in a target image being a target for estimating a position and a pose of the imaging device, and a feature point included in the second image, a position and a pose of the imaging device that captures the target image.

Supplementary Note 2

The information processing apparatus according to supplementary note 1, wherein the first image is an image in which a position and a pose of the imaging device are estimated a predetermined period before a time point at which the target image is input.

Supplementary Note 3

The information processing apparatus according to supplementary note 1, wherein the projection unit uses, as the first image, a third image in which a position and a pose of an imaging device are estimated, and the target image in which a position and a pose of the imaging device are estimated based on a velocity and an angular velocity of the imaging device by using a position and a pose of the imaging device that captures the third image as a starting point.

Supplementary Note 4

The information processing apparatus according to any one of supplementary notes 1 to 3, wherein the projection unit arranges the virtual points on straight lines extending in an imaging direction of an imaging device that captures the first image and a direction opposite to the imaging direction, by using a position of the imaging device as a starting point.

Supplementary Note 5

The information processing apparatus according to any one of supplementary notes 1 to 4, wherein the image extraction unit selects the second image to be extracted, by using the number of the virtual points projected on each image of the plurality of images.

Supplementary Note 6

The information processing apparatus according to supplementary note 5, wherein the image extraction unit selects the second image to be extracted, by using a distance between a position of the imaging device that captures each image of the plurality of images and a position of the imaging device that captures the first image, and a difference in angle between a direction in which the imaging device that captures each image of the plurality of images faces and a direction in which the imaging device that captures the first image faces.

Supplementary Note 7

The information processing apparatus according to any one of supplementary notes 1 to 6, wherein the environment map is generated by executing SfM.

Supplementary Note 8

The information processing apparatus according to any one of supplementary notes 1 to 7, further comprising a management unit configured to manage, as a keyframe, the plurality of images used for generating the environment map and an image satisfying a predetermined criterion from a plurality of images in which a position and a pose of the imaging device are estimated, wherein the estimation unit performs matching between a known feature point included in each of an image captured immediately before the target image, an image added last as the keyframe, and the second image, and a new feature point included in the second image.

Supplementary Note 9

The information processing apparatus according to supplementary note 8, further including a detection unit configured to associate, when a plurality of known feature points are associated to a new feature point included in the second image, one known feature point associated to the new feature point from among the plurality of known feature points, with the new feature point, according to a predetermined criterion.

Supplementary Note 10

The information processing apparatus according to supplementary note 9, wherein the detection unit associates a known feature point included in an image used for generating an environment map by executing SfM among a plurality of known feature points, with the new feature point.

Supplementary Note 11

A position estimation method including:

arranging a predetermined number of virtual points in at least one of a front direction and a back direction of an imaging device which captures a first image, by using an estimated position of the imaging device as a starting point, and projecting the virtual points onto each of a plurality of images used for generating an environment map being three-dimensional information;

extracting a second image from the plurality of images, based on a result of the projection of the virtual points; and estimating, by using a feature point included in a target image being a target for estimating a position and a pose of the imaging device, and a feature point included in the second image, a position and a pose of the imaging device that captures the target image.

Supplementary Note 12

A program for causing a computer to execute:

arranging a predetermined number of virtual points in at least one of a front direction and a back direction of an imaging device which captures a first image, by using an estimated position of the imaging device as a starting point, and projecting the virtual points onto each of a plurality of images used for generating an environment map being three-dimensional information;

extracting a second image from the plurality of images, based on a result of the projection of the virtual points; and estimating, by using a feature point included in a target image being a target for estimating a position and a pose of the imaging device, and a feature point included in the second image, a position and a pose of the imaging device that captures the target image.

REFERENCE SIGNS LIST

10 INFORMATION PROCESSING APPARATUS
11 PROJECTION UNIT
12 IMAGE EXTRACTION UNIT
13 ESTIMATION UNIT
20 INFORMATION PROCESSING APPARATUS
21 ENVIRONMENT MAP GENERATION UNIT
22 IMAGE MANAGEMENT UNIT
23 FEATURE POINT DETECTION UNIT
24 3D POSITION SPECIFICATION UNIT
30 IMAGING DEVICE

31 IMAGE
32 IMAGE
33 IMAGE
34 IMAGE
41 VIRTUAL POINT
42 VIRTUAL POINT
43 VIRTUAL POINT
44 VIRTUAL POINT
45 VIRTUAL POINT
50 REAL-TIME IMAGE
60 OVERLAPPING KEYFRAME

What is claimed is:

1. An information processing apparatus comprising:
at least one memory storing instructions, and
at least one processor configured to execute the instructions to;
generate an environment map being three-dimensional information by using a plurality of images;
arrange a predetermined number of virtual points in at least one of a front direction and a back direction of an imaging device that captures in real time, a predetermined period of time before capturing a target image, a first image by using an estimated position of the imaging device as a starting point, the first image being an image captured by the imaging device arranged in a three-dimensional space, and the virtual points being arranged in the three-dimensional space;
project the virtual points onto each of the plurality of images;
extract, based on a result of the projection of the virtual points, a second image from the plurality of images; and
estimate, by using a feature point included in the target image and a feature point included in the second image, a position and a pose of the imaging device.

2. The information processing apparatus according to claim 1, wherein the first image is an image in which a position and a pose of the imaging device are estimated a predetermined period before a time point at which the target image is input.

3. The information processing apparatus according to claim 1, wherein the at least one processor is further configured to execute the instructions to use, as the first image, a third image in which a position and a pose of the imaging device are estimated, and the target image in which a position and a pose of the imaging device are estimated based on a velocity and an angular velocity of the imaging device by using a position and a pose of the imaging device that captures the third image as a starting point.

4. The information processing apparatus according to claim 1, wherein the at least one processor is further configured to execute the instructions to arrange the virtual points on a straight line extending in at least one of an imaging direction of the imaging device that captures the first image and a direction opposite to the imaging direction, by using a position of the imaging device as a starting point.

5. The information processing apparatus according to claim 1, wherein the at least one processor is further configured to execute the instructions to select the second image to be extracted, by using the number of the virtual points projected on each image of the plurality of images.

6. The information processing apparatus according to claim 5, wherein the at least one processor is further configured to execute the instructions to select the second image to be extracted, by using a distance between a position of the imaging device that captures each image of the plurality of images and a position of the imaging device that captures the first image, and a difference in angle between a direction in which the imaging device that captures each image of the plurality of images faces and a direction in which the imaging device that captures the first image faces.

7. The information processing apparatus according to claim 1, wherein the environment map is generated by executing Structure from Motion (SfM).

8. The information processing apparatus according to claim 1, the at least one processor is further configured to execute the instructions to manage, as a keyframe, the plurality of images used for generating the environment map and an image satisfying a predetermined criterion from a plurality of images in which a position and a pose of the imaging device are estimated, and perform matching between a known feature point included in each of an image captured immediately before the target image, an image added last as the keyframe, and the second image, and a new feature point included in the second image.

9. The information processing apparatus according to claim 8, the at least one processor is further configured to execute the instructions to associate, when a plurality of known feature points are associated to a new feature point included in the second image, one known feature point associated to the new feature point from among the plurality of known feature points, with the new feature point, according to a predetermined criterion.

10. The information processing apparatus according to claim 9, wherein the at least one processor is further configured to execute the instructions to associate a known feature point included in an image used for generating an environment map by executing SfM among a plurality of known feature points, with the new feature point.

11. A position estimation method comprising:

generate an environment map being three-dimensional information by using a plurality of images;

arranging a predetermined number of virtual points in at least one of a front direction and a back direction of an imaging device that captures in real time, a predetermined period of time before capturing a target image, a first image, by using an estimated position of the imaging device as a starting point, the first image being an image captured by the imaging device arranged in a three-dimensional space, and the virtual points being arranged in the three-dimensional space;

projecting the virtual points onto each of the plurality of images;

extracting, based on a result of the projection of the virtual points, a second image from the plurality of images; and estimating, by using a feature point included in the target image and a feature point included in the second image, a position and a pose of the imaging device.

12. A non-transitory computer-readable medium storing a program for causing a computer to execute:

generate an environment map being three-dimensional information by using a plurality of images;

arranging a predetermined number of virtual points in at least one of a front direction and a back direction of an imaging device that captures in real time, a predetermined period of time before capturing a target image, a first image, by using an estimated position of the imaging device as a starting point, the first image being an image captured by the imaging device arranged in a three-dimensional space, and the virtual points being arranged in the three-dimensional space; and projecting the virtual points onto each of the plurality of images;

extracting, based on a result of the projection of the virtual points, a second image from the plurality of images; and estimating, by using a feature point included in the target image and a feature point included in the second image, a position and a pose of the imaging device.

* * * * *